No. 636,970. Patented Nov. 14, 1899.
O. F. FEIX.
LEATHER DRESSING MACHINE.
(Application filed July 15, 1898.)
(No Model.) 2 Sheets—Sheet 1.
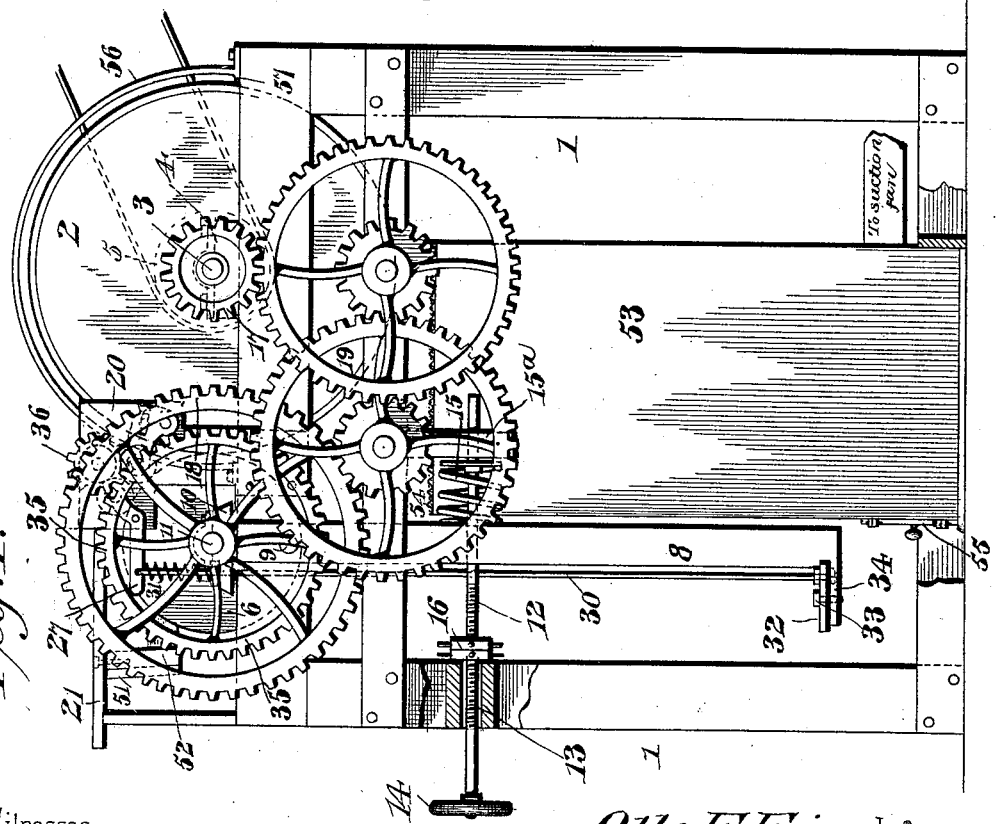
Witnesses
Jas. H. McCathran
H. F. Bumbard
Otto F. Feix, Inventor
By his Attorneys.
C. A. Snow & Co.

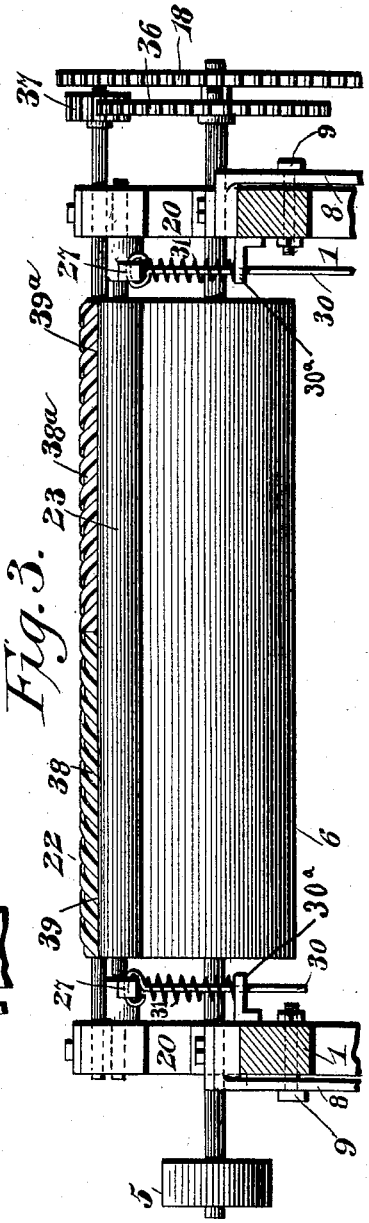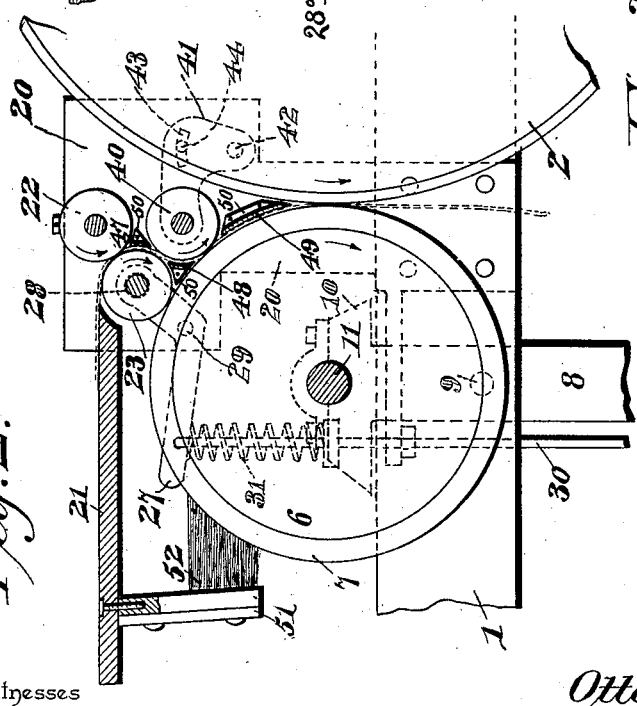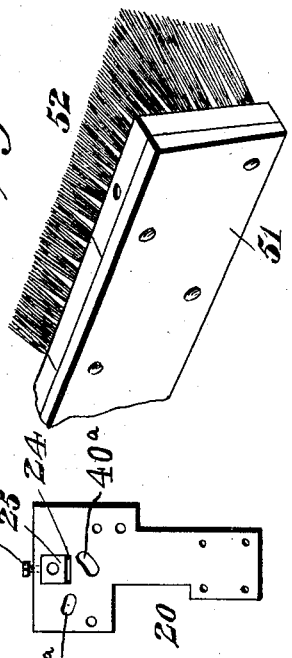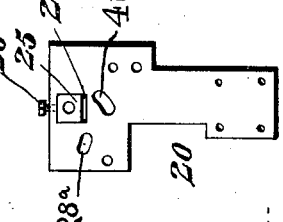

UNITED STATES PATENT OFFICE.

OTTO FELIX FEIX, OF GLOVERSVILLE, NEW YORK, ASSIGNOR OF ONE-HALF TO GODFREY GOTTSCHALK, OF SAME PLACE.

LEATHER-DRESSING MACHINE.

SPECIFICATION forming part of Letters Patent No. 636,970, dated November 14, 1899.

Application filed July 15, 1898. Serial No. 686,084. (No model.)

*To all whom it may concern:*

Be it known that I, OTTO FELIX FEIX, a citizen of the United States, residing at Gloversville, in the county of Fulton and State of New York, have invented a new and useful Leather-Dressing Machine, of which the following is a specification.

My invention relates to improvements in leather-dressing machines for removing the flesh and refuse from skins or hides of the class disclosed by Letters Patent of the United States granted to me March 22, 1898, No. 601,133; and the prime objects of the present invention are to simplify the construction of the machine, insure regularity and uniformity in the speed of the parts relatively to each other, and promote the efficiency of operation and the ease of control of the working devices.

A further object of the invention is to provide an improved feed and stretching mechanism by which the hide or skin may be strained transversely as it is fed to the abrading-roll, so as to insure the skin or hide being fed in a taut condition uniformly throughout its width to the abrasive devices.

A further object of the invention is to provide means which act in conjunction with a yieldable pressure-roll to keep the latter free from accumulations of refuse and prevent the skin or hide from doubling or folding around said pressure-roll.

A further object of the invention is to provide means by which the stretching and pressure rolls may be adjusted to permit of the removal of the work in an easy and convenient manner, and also to carry the loose abrasive material and refuse away from the abrasive devices without liability of the skin being drawn away from said devices.

With these ends in view the invention consists in the novel combination of elements and in the construction and arrangement of parts, which will be hereinafter fully described and claimed.

To enable others to understand the invention, I have illustrated a preferred embodiment thereof in the accompanying drawings, forming a part of this specification, and in which—

Figure 1 is a side elevation of a leather-dressing machine embodying my invention. Fig. 2 is an enlarged vertical section through the stretching and feed mechanism and the pressure-roll, illustrating a portion of the abrading-roll and the work-table. Fig. 3 is a view in front elevation of the front end of the machine, showing the peculiar form of the stretching and feed rolls and certain of the parts which coact therewith. Fig. 4 is a detail fragmentary view of one form of the equalizing-roll which coacts with the yieldable pressure-roll. Fig. 5 is a detail view of a part of the cleaning-brush. Fig. 6 is a fragmentary detail of the suction-box. Fig. 7 is a similar view of a portion of one of the adjusting-bars for the yieldable pressure-roll and showing a pressure-bar for one of the stretching-rolls loosely connected with said adjusting-bar. Fig. 8 is a detail view of one of the bearing-plates by which the stretching and feed rolls and the equalizing-roll are mounted in the framework of the machine.

Like numerals of reference denote like and corresponding parts in each of the several figures of the drawings.

1 designates the framework of the machine, on which all of the operating appliances are mounted. The abrasive roll 2 has its shaft 3 journaled in suitable bearings 4, which are rigidly secured to the frame, and this abrasive roll has its surface covered by a layer of abrasive material of any suitable character. To one end of the shaft 3 is rigidly secured a driving-pulley 5, around which passes a belt that drives the abrasive roll, and from this shaft 3 is driven the gearing by which the yieldable pressure-roll and the set of coacting stretcher-rolls are driven. In my prior patent, to which reference has been made, the feed and pressure rolls are driven by belt-gearing; but to insure uniformity and regularity in the speed of rotation of the several rolls I have discarded the belt-gearing, and in lieu thereof I employ the spur-gearing shown more particularly by Fig. 1.

The pressure-roll 6 of my improved machine is arranged beneath the work-table and in close relation to the abrasive roll 2 to coact with the latter. This pressure-roll has its working surface 7 formed of yieldable material, preferably rubber, which is arranged in a layer continuously around the periphery of said roll. The pressure-roll is yieldingly held under spring-pressure in active engagement with the abrasive roll, and to properly support this pressure-roll in place, so as to permit the roll to be moved manually away from the abrasive roll, and thereby withdraw the work from said rolls, I employ the adjusting-bars 8. These bars are arranged in vertical positions alongside of the frame and at the ends of the pressure-roll, and said bars are fulcrumed near their upper ends, as at 9, to the frame 1. The upper extremities of the adjusting-bars are enlarged to produce the heads 10, which form the lower halves of the journal-bearings that receive the shaft 11 of the pressure-roll 6, and this pressure-roll is thus mounted in the pivoted bars 8 for adjustment therewith toward or from the abrading-roll. The pivoted bars and the pressure-roll are normally held by the stem or spindle 12 and the pressure-spring 15 to maintain the roll 6 in active relation to the abrading-roll. The stem or spindle 12 is suitably connected to one of the pivoted adjusting-bars, and the threaded length of said stem or spindle passes through a guide opening or slot 13, formed at the front side of the frame 1. A hand-wheel 14 is provided on the outer protruding end of this stem or spindle for rotating the spindle when desired, and the pressure-spring 15 is fitted loosely on the spindle, so as to have one end seated against the adjusting-bar 8 and the other end bear against a fixed plate on the stem, which slides in an arm 15ᵃ, fixed to the frame. The adjusting-nuts 16 are screwed on the threaded length of the stem or spindle, so as to bear against the frame around the opening 13 therein, and by proper adjustment of these nuts the play of the stem or spindle and the tension of the spring 15 may be regulated within the limits desired by the operator.

The pressure-roll is driven positively by gear connections with the abrading-roll, and in Fig. 1 I have shown the shaft of the abrading-roll as provided with a gear-pinion 17, while the shaft of the pressure-roll has a gear-wheel 18, said gears 17 18 being operatively connected to the train of idle gears 19, whereby the pressure-roll is driven in an opposite direction to and at a slower speed than the abrading-roll. The pressure-roll rotates at a very slow speed, because the train of gears 19 materially reduces the speed of the roll 6 as compared with the speed of the roll 2, the latter being designed to rotate at a comparatively high speed, varying from seven hundred and fifty to one thousand revolutions per minute.

20 designates the bearing-plates, which are secured to opposite sides of the frame adjacent to the abrading and pressure rolls, so as to extend above the table 21, over which the work is fed to the stretching and feed rolls 22 23. The bearing-plates are secured rigidly to the sides of the frame 1, and they serve to directly support the upper feed-roll 22 and as the means for attachment of the devices by which the lower feed-roll and the equalizing-roll are supported within the machine. Near their upper ends these bearing-plates are provided with vertical slots 24, which receive the bearings 25 for the upper feed and stretching roll 22. The bearings 25 for the ends of the upper roll 22 may be adjusted vertically in the slot 24 of said plate 20 by adjusting-screws, one of which is shown at 26 in Fig. 8. The lower stretcher-roll 23 is carried by angular arms 27, each of which is formed with an opening 28, that constitutes a journal-bearing for one end of the shaft for the lower roll 23, and these angular arms are pivoted, as at 29, to the bearing-plates 20. The arms 27 lie between the bearing-plates and the ends of the pressure-roll, and to the free ends of said arms are loosely connected the upper ends of the adjusting-rods 30. Around these adjusting-rods are loosely arranged the coiled pressure-springs 31, which act against the arms 27 and force the lower roll 23 into engagement with the upper roll 22. The springs 31 are seated at their lower ends on suitable supporting devices 30ᵃ, (see Fig. 3,) which are shown as attached to the sides of the machine-frame, and the springs are thus adapted to exert an upward pressure against the hangers 27 for the purpose of normally forcing the movable stretcher-roll 23 into engagement with the ribbed and positively-driven stretcher-roll 22. The supports 30ᵃ should be wide enough and provided with elongated holes, through which the rods 30 are adapted to play, as will presently appear, and said adjusting-rods 30 are attached at their lower ends to a foot-pressure bar 32, which is connected loosely by the bolts 33 to the short arms 34 on the lower extremities of the adjusting-bars 8.

From the foregoing description it will be seen that the pressure-roll is carried by a pair of swinging adjusting-bars, against which acts a spring on the adjusting-stem, that normally holds the pressure-roll in engagement with the abrading-roll, and one of the stretching-rolls is normally pressed in engagement with the other stretcher-roll by the springs which are connected with devices for controlling the movable stretcher-roll. The pressure-roll may be adjusted away from the abrading-roll by the operator pressing against the foot-bar in a direction to overcome the resistance of the springs 15 and move the headed upper ends of the bars and the roll 6 away from the abrading-roll, thus permitting the operator to withdraw the work from the pressure and the abrading rolls. The stretching-rolls 22 23 may also be separated for easy removal of the work by applying pressure to the foot-bar 32 in a downward direction, thereby depressing the outer ends of the angular arms 27 against the tension of the springs 31 and retracting the lower stretcher-roll 23 away from the upper stretcher-roll 22. The adjustment of the pressure-roll and the stretcher-roll 23 may take place simultaneously; but, if desired, the lower stretching-roll may be moved independently of the pressure-roll, because the foot-bar is loosely connected with the adjusting-bars for the pressure-roll.

The pressure-bar 32 is attached to the vertical rods 30, so as to be capable of an up-and-down movement therewith, the upward movement of the pressure-bar with the rods being effected by means of the coiled springs 31, which are seated on the fixed supports 30$^a$. This pressure-bar is connected loosely with the feet or angular projections 34 on the pivoted adjusting-bars 8 by means of the elongated bolts 33, which pass through suitable holes or slots provided in the pressure-bar 32, as shown by Fig. 7, and are fixed to the angular feet or projections 34 of the bars 8. These bolts should extend a suitable distance above the pressure-bar 32 for the latter to have the necessary vertical movement under the lifting effect of the coiled springs 31; but when the operator applies pressure in a downward direction on the pressure-bar 32 the rods 30 are depressed to compress the springs 31 and shift the pivoted hangers 27 for the adjustment of the roll 23 relatively to the roll 22. The springs 31 should be of strong tension in order to resist any slight pressure which may be exerted by the operator on the pressure-bar 32 for swinging the bars 8 and the pressure-roll 6 relatively to the abrasive roll, and the bar 32 is thus adapted to serve as the means for adjusting the pivoted bars 8 and the pressure-roll 6, as well as for depressing under considerable pressure applied by the operator the rods 30, which control the hangers 27 and the stretcher-roll 23. As the rods 30 are attached to the pressure-bar 32, which is supported loosely on the adjusting-bars 8, it is necessary to loosely connect the rods 30 to the roll-hangers 27, as shown by Figs. 2 and 3, and to provide a hook or hinged connection between the pressure-bar 32 and the rods 30, so that the rods 30 and the pressure-bar 32 will partake of the desired vertical movement.

The upper stretching-roll 22 is driven positively from the pressure-roll through the intermeshing gears 35 36, which are secured to the shafts of said stretching-roll 22 and the pressure-roll 6, while the lower stretching-roll 23 is driven in an opposite direction to the upper stretching-roll 22 by frictional contact or engagement between the pairs of rolls.

My improved machine has the stretching-rolls 22 23 constructed in a peculiar manner to strain the hide or skin transversely as it is fed from the table to the abrasive appliances. By reference to Fig. 3 it will be seen that the upper stretching-roll 22 has its working surface formed with spiral grooves 38 38$^a$, the grooves 38 extending in one direction from the middle of the roll toward one end of said roll, while the other grooves 38$^a$ extend from the middle of the roll in an opposite direction toward the other end thereof. The other roll 23 consists of a single solid steel roller, which is smooth externally and is arranged to engage frictionally with the surface of the spirally-ribbed companion roller. This grooved and ribbed roll grasps the hide or skin as it is moved from the table between the rolls, and said grooves and ribs of the roll 22, acting in conjunction with the roll 23, serve to strain the skin transversely to the line of feed in a uniform manner, thereby feeding the skin in a taut condition to the abrasive appliance and preventing the skin from wrinkling. The upper stretcher-roll 22 has its axis located above the face of the table, while the lower roll 23, which coacts therewith, is situated between the table and the pressure-roll, thus causing the skin to pass between the stretching-rolls before it reaches the abrasive appliance. Between the lower stretching-roll 23 and the pressure-roll 6 I have interposed an equalizing-roll 40, which coacts with the yieldable pressure-roll 6 and serves to present the skin in a smooth condition to the pressure-roll. This equalizing-roll has its shaft journaled in the hangers 41, which are adjustably attached by the pivots 42 to the bearing-plates 20, and said hangers are provided with segmental slots 43, through which are passed the adjusting-bolts 44, which are screwed to the bearing-plates 20, whereby the equalizing-roll may be adjusted toward or from the pressure-roll. This equalizing-roll may consist of a single solid steel roller, substantially as shown by Fig. 2; but for treating some kinds of skins I find it desirable to employ a sectional or built-up roll of the character represented by Fig. 4. This sectional roll embraces a solid core 45 and a series of roll-sections 46, which are threaded loosely on the core and are confined in contact with each other endwise by suitable stop devices. The hangers 41 may be adjusted to release the roll 40 from the pressure-roll 6, thereby making provision for the removal of one style of roll and the substitution of another roll, after which the hangers should be restored to their normal conditions to place the equalizing-roll in contact with the yieldable surface of the pressure-roll. To accommodate the movement of this equalizing-roll, as well as the movement of the lower stretcher-roll 23, the bearing-plates 20 are provided with arcuate slots 28$^a$ and 40$^a$, which respectively receive the shaft extremities of the said stretcher-roll and equalizing-roll.

To properly direct the hide or skin through the rolls, I employ a series of arc-shaped guide-plates 47, 48, and 49, each guide-plate having flanges 50 at the ends thereof by which they may be firmly secured through the medium of bolts or screws to the frame. I preferably provide the guide-plate with a straight working surface. The plate 47 is arranged below the upper roll 22 to present its working surface opposite to the face of the lower stretching-roll 23, the plate 48 is arranged below the roll 23 and above the pressure-roll 6 to present its working face opposite to the surface of the equalizing-roll 40, while the plate 49 is attached to the frame below the equalizing-roll 40 to present its working face to the yieldable surface 7 on the pressure-roll.

51 designates a brush-head which is arranged below the table contiguous to the pressure-roll 6. This head may consist of a suitable wooden bar or metallic plate firmly fastened by screws against the under side of the table, and to one face or side of this head is secured a series of brushes 52, the bristles of which are arranged to have frictional contact with the yieldable surface of the pressure-roll. This brush device sweeps the surface of the pressure-roll free from the accumulation of any refuse and abrasive material from the roll 2, and said brush also serves the important purpose of preventing the skin or hide, should it be carried partly around with the roll 6, from doubling or folding around said roll, thereby obviating injury to the hide.

I have also provided my machine with means by which the refuse and the loose abrasive material are carried off, and to this end a suction-box 53 is arranged within the framework 1 below the abrasive and pressure rolls. The upper open end of this suction-box has a grate or foraminous top 54, through which is drawn the refuse and loose abrasive material which passes between the rolls 2 6; but this grate prevents the skin or hide from being drawn into the suction-box. This suction-box is designed to be operatively connected by a flue or pipe with a suction-fan, (not shown,) and to permit of the ready removal of the contents of said box I provide it with a slide-door 55, which normally is closed.

In operation the several rolls are driven by the belt from any suitable source of power and through the train of gears. The hide or skin to be treated is flattened out on the table and fed between the stretcher-rolls 22 23, which strain it uniformly in opposite directions. The hide passes between the plate 47 and roll 23, thence between the roll 40 and plate 48, thence between the rolls 6 40, thence between the plate 49 and roll 6, and finally between the rolls 6 2. The fleshy side of the hide is subjected to abrasive action of the surface on the roll 2 and is held in contact with the latter by the spring-pressed roll 6, the yieldable surface of which gives sufficiently to permit any irregularities or inequalities of the skin to pass between the coacting rolls. The suction through the box 53 carries off the refuse and loose abrasive material; but the grate of the box prevents the skin from passing into the same. The brush keeps the surface of the roll 6 free from accumulations and prevents the hide or skin from doubling around said roll. The pressure-roll may be adjusted away from the abrading-roll or the lower stretching-roll may be moved away from the upper stretching-roll to permit the work to be removed.

I also provide the machine with a removable cover 55, which is of segmental metallic construction, arranged to embrace the abrasive roll closely, and this cover is flanged at 56 to rest upon the frame, to which it is securely fastened by bolts or otherwise. This cover has an inwardly-extending scraper 57, arranged to nearly touch the roll and keep the same free from accumulations of dust and loose abrasive matter.

Slight changes may be made in the form of some of the parts, while their essential features are retained and the spirit of the invention embodied. Hence I do not desire to be limited to the precise form of all the parts as shown, reserving the right to vary therefrom.

Having thus described the invention, what I claim is—

1. In a leather-dressing machine, the combination of the positively-driven abrasive roll, a pair of coacting stretcher-rolls, one of which has its working surface formed with spiral grooves which incline in opposite directions from the transverse center of the roll, and an equalizing-roll coöperating with the pressure-roll and one of the stretcher-rolls, substantially as set forth.

2. In a leather-dressing machine, the combination of a positively-driven abrasive roll, a pressure-roll mounted for manual adjustment relatively to the abrasive roll and adapted to be driven when in frictional contact therewith, a pair of coacting stretcher-rolls one of which has its working surface formed with spiral grooves which are inclined in opposite directions, means for positively driving the grooved stretcher-roll, means for holding the other smooth stretcher-roll in frictional engagement with the grooved roll under yieldable pressure, and an equalizing-roll situated in a plane between the meeting faces of the stretching-rolls and contiguous to the face of the pressure-roll, substantially as described.

3. In a leather-dressing machine, the combination with a positively-driven abrasive roll, and a pressure-roll, of a set of coacting stretching and feed rolls, and an equalizing-roll disposed in coactive relation to one of the stretching-rolls and to the pressure-roll, substantially as described.

4. In a leather-dressing machine, the combination of a positively-driven abrasive roll, a pressure-roll mounted for movement relatively to the abrasive roll and arranged to be driven positively in an opposite direction thereto, a set of coacting stretcher-rolls, an equalizing-roll in coactive relation to one of the stretcher-rolls and the pressure-roll, and arc-shaped guide-plates situated between said stretcher, equalizing and pressure rolls and having their arc-shaped working faces opposed to one of the stretching-rolls and the equalizer-roll, substantially as described.

5. In a leather-dressing machine, the combination of a positively-driven abrasive roll, a pressure-roll in active relation thereto, a set of coacting stretcher-rolls, the adjustable slotted hangers pivotally supported at one side of the pressure-roll and having means for firmly clamping the same in place, and an equalizing-roll journaled in said hangers in operative relation to the pressure-roll and one of the stretcher-rolls, substantially as described.

6. In a leather-dressing machine, the combination with an abrasive roll and a pressure-roll, of a set of coacting stretcher-rolls one of which is ribbed and the other is movable in parallel relation to the ribbed roll, the pivoted hangers carrying said movable stretcher-roll at one end thereof, rods connected to said hangers, pressure-springs coöperating with said hangers, and a foot-bar attached to the rods, substantially as described.

7. In a leather-dressing machine, the combination with a feed-table, an abrading-roll and a pressure-roll, of a set of coacting stretcher-rolls one of which is yieldable under pressure in a path parallel to the other roll, a fixed guide-plate having an arcuate working face presented to the yieldable pressure-roll, an equalizing-roll contiguous to one of the stretcher-rolls and the pressure-roll, and another fixed guide-plate having its arcuate face in active relation to the equalizing-roll, substantially as described.

8. In a leather-dressing machine, the combination with an abrasive roll, of the pivotal adjusting-bars, a pressure-roll journaled in said bars, pressure-springs acting against the bars, the pivoted arms, a pressure-bar loosely connected to the adjusting-bars, spring-pressed rods between the pressure-bar and the pivoted arms, and a set of stretcher-rolls one of which is mounted in the adjusting-arms, substantially as described.

9. In a leather-dressing machine, the combination with the abrasive and pressure rolls, of a suction-box arranged below said rolls and having a horizontal foraminous top portion crossing the vertical plane between the meeting faces of the rolls, said foraminous horizontal top portion being disposed in proximal relation to said rolls to provide a support for the hides or skins as they leave the latter, and a suction-flue in communication with said box to provide for drawing refuse and loose abrasive material through said foraminous top portion, substantially as set forth.

10. In a leather-dressing machine, the combination of a revoluble abrasive roll, a pressure-roll coacting therewith, a set of coacting stretcher-rolls above the pressure-roll, pivoted hangers arranged at one side of the pressure-roll, means for adjustably fastening said hangers, and an equalizing-roll having a core mounted in the hangers and a series of sections which are threaded on the core, said sectional equalizing-roll being presented contiguous to one of the stretcher-rolls and the pressure-roll, substantially as described.

In testimony that I claim the foregoing as my own I have hereto affixed my signature in the presence of two witnesses.

OTTO FELIX FEIX.

Witnesses:
 JOS. J. SCHIFFER,
 A. GOTTSCHALK.